US006269726B1

(12) United States Patent
McNulty, Sr.

(10) Patent No.: US 6,269,726 B1
(45) Date of Patent: Aug. 7, 2001

(54) MULTI-SHOT, NON-LETHAL, TASER CARTRIDGE REMOTE FIRING SYSTEM FOR PROTECTION OF FACILITIES AND VEHICLES AGAINST PERSONNEL

(75) Inventor: James F. McNulty, Sr., Anaheim, CA (US)

(73) Assignee: Barnet Resnick, Newport Beach, CA (US)

( * ) Notice: Subject to any disclaimer, the term of this patent is extended or adjusted under 35 U.S.C. 154(b) by 0 days.

(21) Appl. No.: 09/327,595

(22) Filed: Jun. 8, 1999

Related U.S. Application Data

(63) Continuation-in-part of application No. 08/991,268, filed on Dec. 16, 1997, now Pat. No. 5,936,183.

(51) Int. Cl.[7] .......................... B64D 1/04

(52) U.S. Cl. .......................... 89/1.11; 89/41.05; 102/502; 102/425; 361/232

(58) Field of Search .......................... 89/1.11, 1.1, 41.05; 361/232; 102/502, 425

(56) References Cited

U.S. PATENT DOCUMENTS

| | | | | |
|---|---|---|---|---|
| 3,803,463 | * | 4/1974 | Cover | 89/1.11 |
| 4,253,132 | * | 2/1981 | Cover | 361/232 |
| 5,379,676 | * | 1/1995 | Profeta et al. | 89/41.05 |
| 5,685,636 | * | 11/1997 | German | 362/259 |
| 5,686,690 | * | 11/1997 | Lougheed et al. | 89/41.05 |
| 5,936,183 | * | 8/1999 | McNulty, Sr. | 89/1.11 |
| 5,955,695 | * | 9/1999 | McNulty, Sr. | 89/1.11 |

* cited by examiner

*Primary Examiner*—J. Woodrow Eldred
(74) *Attorney, Agent, or Firm*—Leonard Tachner

(57) ABSTRACT

An armored, motorized unit incorporating a gimbaled gun sighted video camera and an attached multi-shot TASER® cartridge firing system to remotely fire one cartridge at a time at a remotely selected target. A remotely located operator rotates the unit in azimuth and elevation to aim at a target within the range of the firing system. The firing system has multiple cartridges that can be rotated into a boresight position, one at a time, and armed, one at a time, for firing a pair of wire-tethered contacts such as darts at the selected target.

10 Claims, 4 Drawing Sheets

MULTI-SHOT, NON-LETHAL, TASER CARTRIDGE REMOTE FIRING SYSTEM FOR PROTECTION OF FACILITIES AND VEHICLES AGAINST PERSONNEL

RELATION TO CORRESPONDING APPLICATIONS

This application is a continuation-in-part of patent application Ser. No. 08/991,268 filed on Dec. 16, 1997 and now issued as U.S. Pat. No. 5,936,183.

BACKGROUND OF THE INVENTION

1. Field of the Invention

The present invention relates generally to the field of defensive weapons and more particularly to a defensive weapon comprising a multi-cartridge, remotely operated, TASER® system affixed to a video camera for remote selection of the boresight direction for cartridge activation.

2. Prior Art

A non-lethal, cartridge-based TASER® weapon is disclosed in the following U.S. Pat. Nos. 3,803,463 issued Apr. 9, 1974 entitled WEAPON FOR IMMOBILIZATION AND CAPTURE; and U.S. Pat. No. 4,253,132 issued Feb. 24, 1981 entitled POWER SUPPLY FOR WEAPON FOR IMMOBILIZATION AND CAPTURE. Each cartridge comprises a pair of wire tethered contacts such as darts and a propulsion source such as gun powder, gas, or the like. The wires are connected to opposite polarities of a high voltage, low current, pulsed source of power. Upon activation of the weapon, the two darts are explosively propelled toward a selected target. Simultaneously, the high voltage is applied through the wires to the metal pins of the darts. The voltage is applied across the target's surface, producing a non-lethal, but temporarily disabling pulsed current.

The applicant's parent application, now issued U.S. Pat. No. 5,936,183 of which the present application is a continuation-in-part, discloses a multiple cartridge weapon which may be used in a manner analogous to mines to disable multiple personnel, but without the lethality of unexploded mines inadvertently activated by innocent bystanders after hostilities have ended. However, the mine-like weapon is implemented without real time control and without any form of accurate aiming as is typical in a more conventional TASER® weapon.

There is a continuing need for a multiple cartridge TASER® system which may be used for defense against multiple personnel and which can be used to fire one cartridge at a time at accurately selected targets and under real time personnel control.

SUMMARY OF THE INVENTION

The present invention is intended to protect police stations, other government buildings and key facilities such as airports, embassies, armories, TV and radio stations from assault, during major demonstrations or riots, and to protect internal corridors, without resorting to lethal force. A number of the inventive systems are used in the facility so that they also cover each other from assault. For military operations other than warfare, the system, in addition to perimeter control, can also be turret mounted on a vehicle to protect food distribution trucks, etc. This non-lethal weapon is controlled via remote video from a hardened security room within the facility or from the vehicle cab. The invention is useful for force protection operations and can be part of a dual force capability system to minimize force against intruders and agitators that are not lethally armed while providing a longer range, lethal option against suicide attacks or lethally armed assailants as part of a common weapons platform.

The device is a permanently installed, armored, motorized unit incorporating a gun sighted video camera and a multiple cartridge TASER® system to remotely fire one cartridge at a time. An indexing plate automatically rotates to sequentially bring each cartridge into the boresighted position that is aligned with the video camera sight. The unit is gimbaled so that an operator in a remote location can rotate the unit in both azimuth and elevation to accurately aim at a subject within a 30 foot range of the device. As the first of a plurality of shots available is fired, the indexing plate automatically rotates to align the second cartridge to boresight and arms the second cartridge. Cartridges are not armed until they are in boresight position, but once fired they remain activated until manually deactivated by the operator. The unit is designed to resist thrown rocks and small arms fire from 30 feet away. Once the TASER® is fired, an inherent fear of electricity generally causes hostile persons to withdraw to a safe distance. In the worst case, the device would delay an assault to permit timely calls for assistance and to assemble tactical teams and reserves to deal with the situation.

OBJECTS OF THE INVENTION

There are therefore a number of objects of the present invention a principal one of which is to provide a multiple firing TASER® device which may be aimed from a remote site to temporarily incapacitate hostile persons within a selected distance.

Another object of the invention is to provide a multiple firing TASER® device attached to an electronic sighting device such as a TV camera and to a gimbaled platform to permit remote sighting and aiming against selected targets.

It is still another object of the present invention to provide a multiple firing TASER® device having a remotely controlled moveable boresight which may be adjusted in at least two orthogonal directions for altering the firing direction at each respective firing.

BRIEF DESCRIPTION OF THE DRAWINGS

The aforementioned objects and advantages of the present invention, as well as additional objects and advantages thereof will be more fully understood hereinafter as a result of the detailed description of a preferred embodiment when taken in conjunction with the following drawings in which.

DETAILED DESCRIPTION OF A PREFERRED EMBODIMENT

Figure 1:
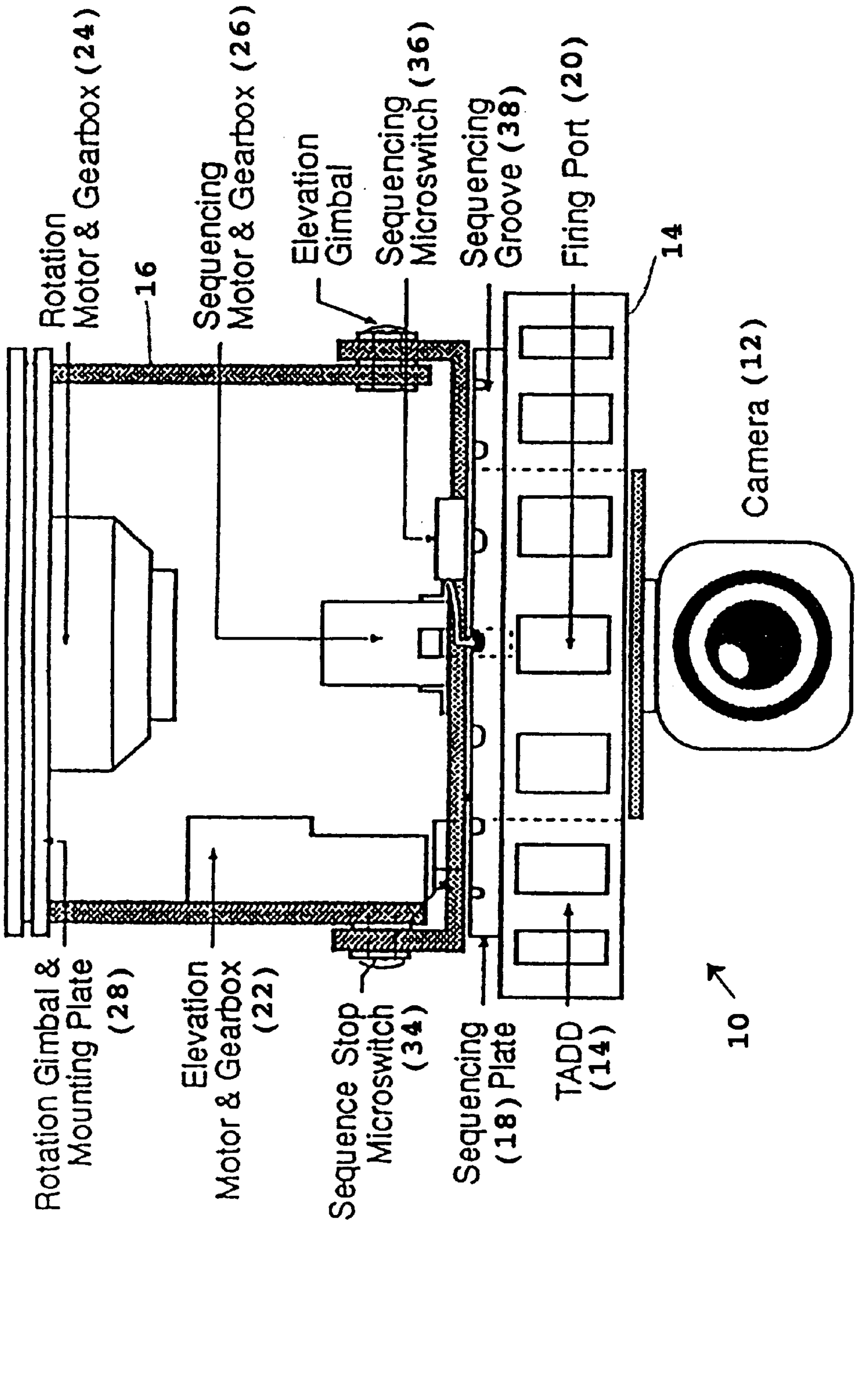
FIG. 1 is a front elevation view of the invention.
Figure 2:
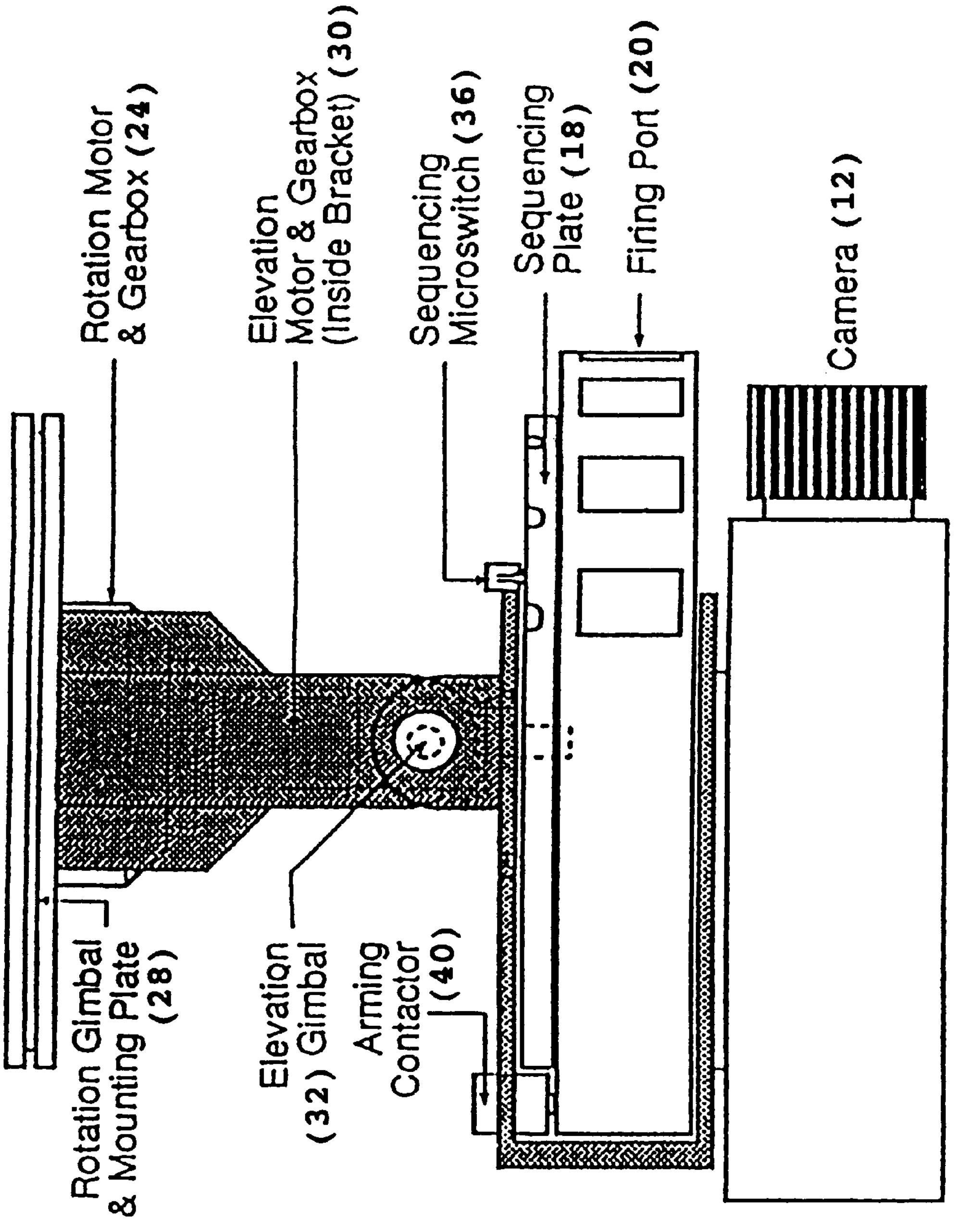
FIG. 2 is a right elevation view of the invention.
Figure 3:
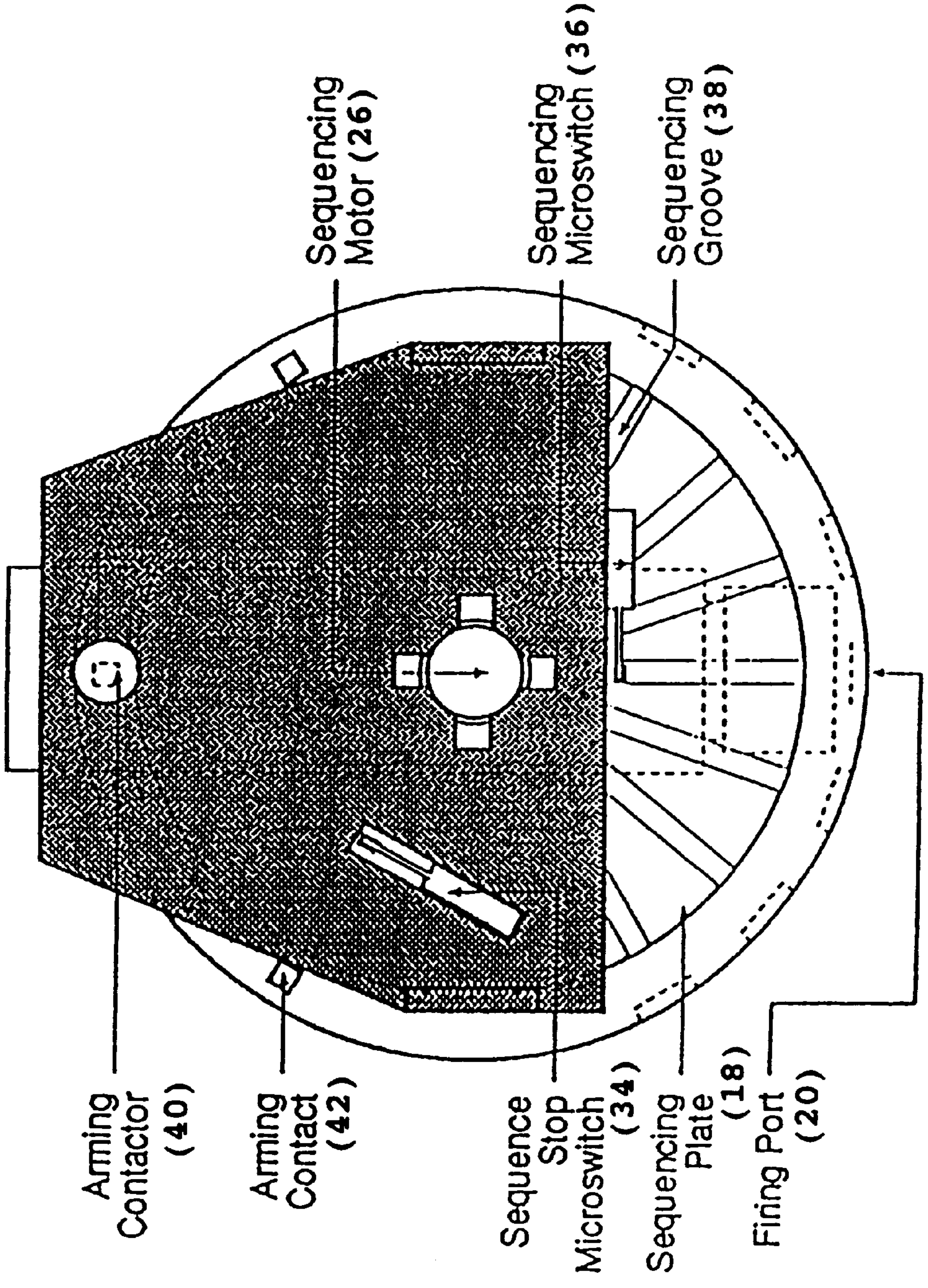
FIG. 3 is a top view with an upper mounting bracket and gimbals removed for clarity.

Referring to the accompanying drawings, and initially FIGS. 1–3, it will be seen that a preferred embodiment 10 of the present invention comprises three main components. These components are a camera 12, a TASER® device 14 (also referred to as TADD for TASER® area denial device) and a motion control apparatus 16. The camera 12 is preferably a real time video imaging camera with relatively good resolution up to at least 50–100 feet. The TASER® device 14 is essentially identical to that disclosed in Applicant's parent application of which this application is a continuation-in-part. However, unlike that previously disclosed TADD,TASER® device 14 has attached to it an indexing or sequencing plate 18 that automatically rotates to sequentially bring each cartridge firing port 20 into a boresight position that is aligned with the video camera boresight. In this manner, there is always one cartridge ready to be fired along the direction of the camera boresight until all of the seven cartridges have been deployed. Only one cartridge at a time is fired which differs from the TADD of Applicant's parent disclosure where all of the cartridges are fired simultaneously.

The pointing direction of the camera 12 and the TADD 14 including the sequencing plate 18, is determined by operation of the motion control apparatus 16. Apparatus 16 comprises an elevation motor and gearbox 22, a rotation motor and gearbox 24 and a sequencing motor and gearbox 26. The rotation motor and gearbox 24 is mounted on a rotation gimbal and mounting plate 28. The elevation motor and gearbox 22 is mounted to a bracket 30 which has the elevation gimbal 32. Thus the apparatus 16 permits motion control of the camera 12 and TADD 14 in both elevation and azimuth so that targeting may be achieved in virtually any direction over at least close to a hemisphere of total area.

The sequencing plate 18 is controlled by the sequencing motor and gearbox 26 as well as sequence stop switch 34 and microswitch 36 along with a plurality of sequencing grooves 38 shown best in FIG. 3. Aiming contactor 40 and arming contacts 42 (shown in FIG. 3) will be better understood hereinafter from the following discussion of operating sequence in conjunction with FIG. 4.

Operating Sequence to Fire Multiple Non-Lethal Rounds

Figure 4:
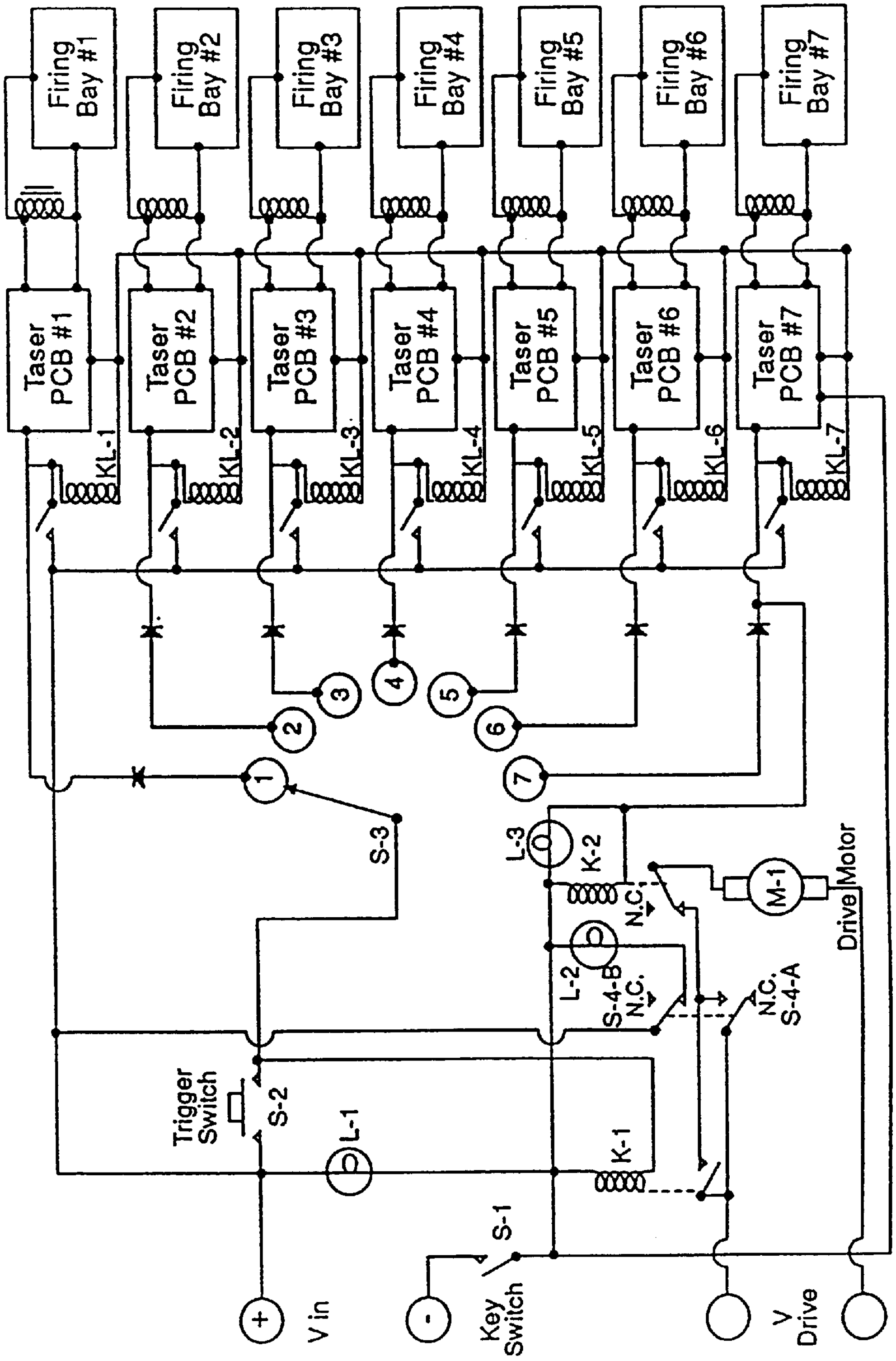
FIG. 4 is a simplified schematic/block diagram of the TASER® device used in the invention.

Referring to FIG. 4, it will be seen that an input voltage Vin is continuously applied to the system input terminals. The invention is sighted through a boresighted video camera which may be mounted either above or below the firing port. The device may be Kevlar armored against small arms fire. As shown therein, the TASER® AREA DENIAL DEVICE (TADD) comprises seven firing bays, seven TASER® printed circuit boards (PCBS), seven relays (KL), seven transformers, a seven position sequencing contactor (S-3), trigger switch (S-2), key switch (S-1) and sequencing motor drive switch (S-4).

When key switch lock S-1 is closed, "System Armed" indicator L-1 illuminates and the return lead of all TASER® circuits, all latching relays, all indicators and momentary relay K-1 are connected to Vin return. Sequencing contactor S-3 is in a firing slot position of the sequencing plate and sequencing switch S-4 actuator is in the boresighted firing slot in line with the firing port. S-4B is closed illuminating "Armed Round" indicator L-2. Switch S-4A is open and momentary relay K-1 contacts are open and the rotational drive motor is off.

If for any reason sequencing contactor S-3 was not in the firing slot position, switch S-4A would be closed (and S-4B open) and power would be applied to the rotation drive motor until the next firing slot in the sequencing plate reaches the boresighted line of the firing port. The sequence would then be as described above.

When trigger switch S-2 is momentarily pressed, power is applied through the sequencing contactor S-3 to the TASER® circuit in the boresighted firing port position, firing the TASER® cartridge. The momentary power from S-2 also is applied to the circuit latching relay K-2 which closes thereby keeping power continuously applied to the fired TASER® circuit* until switch lock S-1 is once again opened. The power from switch S-2 is also applied through momentary relay K-1 contacts to the rotational drive motor to start the motor. As the sequencing switch S-4 comes out of the boresighted firing slot, S-4B opens turning off indicator L-2 and S-4A closes applying power to the rotational drive motor until sequencing switch S4** drops into the next firing slot that reaches the boresighted firing position.

* Each TASER® circuit contains a cycle timer that briefly interrupts power about every ten seconds.

** Additional switches may be added to allow individual TASER® circuits to be separately turned off if desired while keeping the device active.

The next TASER® circuit and cartridge are now in the firing position and the above sequence may be repeated if needed.

When the last cartridge is sequenced into firing position the "Last Round" indicator is illuminated warning the operator that his last live round is in firing position. After this round is fired, the weapon must be reloaded before it can incapacitate additional subjects. Before reloading, the keyed switch lock S-1 must be turned to the "Safe" (off) position to disable the device.

Having thus described a preferred embodiment, it being understood that other alternative embodiments of the invention are contemplated as being within the scope hereof, what is claimed is:

1. A remotely controlled non-lethal anti-personnel device for observing nearby personnel and sequentially firing a plurality of electrical discharge darts at such personnel for temporarily disabling the personnel; the device comprising:

a housing having a plurality of firing bays, each such bay having at least one contactor dart for selectively being fired in a selected direction;

a plurality of high-voltage transformers, each such transformer being electrically connected to at least one dart by a wire to which the dart remains connected after firing; and means for observing nearby personnel and remotely aiming and activating said firing bays for sequentially firing said darts and applying a high-voltage discharge to disable the nearby personnel.

2. The device recited in claim 1 wherein said means for observing comprises a television camera pointed in the same direction as the selected direction of the dart being fired.

3. The device recited in claim 2 wherein said means for observing further comprises a remotely positioned television monitor receiving a video signal from said television camera.

4. The device recited in claim 2 wherein said means for observing further comprises at least one gimbal and motor drive for selectively changing the selected direction of said television camera and said dart.

5. The device recited in claim 4 wherein said means for observing further comprises a remote activator for selectively activating said motor drive for changing said selected direction about said gimbal.

6. The device recited in claim 4 wherein said means for observing comprises motor drives and gimbals for remote activation of housing motion about at least two orthogonal axes.

7. The device recited in claim 1 wherein said means for observing nearby personnel comprises motor drives and gimbals for remotely rotating said housing in both elevation azimuth.

8. The device recited in claim 1 further comprising a sequencing plate for positioning each said firing bay in said selected direction after the dart of a previous firing bay has been fired.

9. The device recited in claim 1 further comprising means for removing voltage from said darts at a selected period of time after firing.

10. A defensive security system having non-lethal electrically energized wire-tethered darts for firing at hostile personnel by remote aiming and activation; the system comprising:

a multiple firing bay device having a plurality of sequentially alignable firing bays each having said darts;

a television camera mechanically connected to said device so that the camera and the device share a common boresight direction; and a remotely controlled directional controller and firing initiator for altering the boresight direction of said camera and said device in accordance with the relative position of said personnel and then firing said darts.

* * * * *